Figure 1:
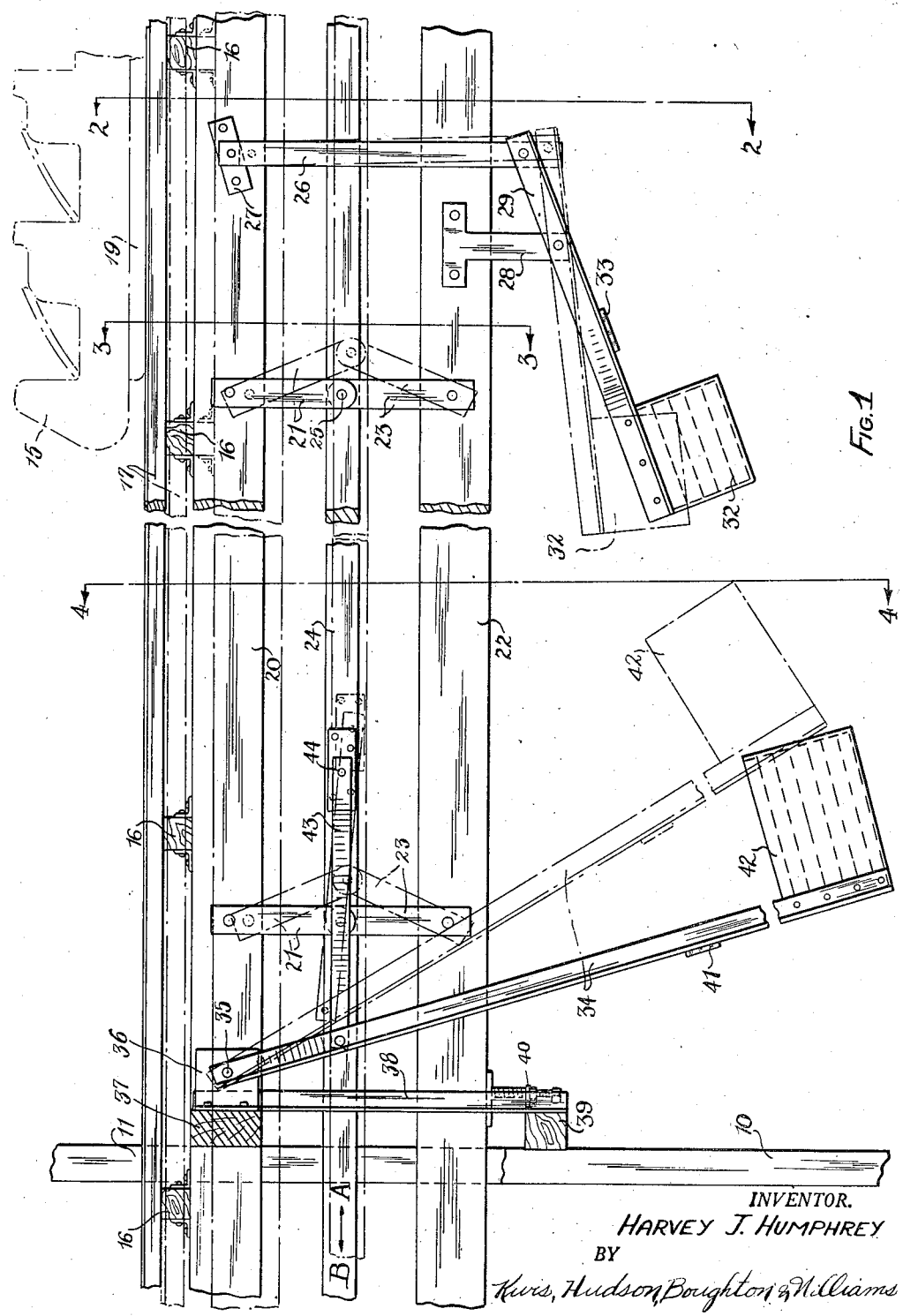

June 17, 1947. H. J. HUMPHREY 2,422,416
SAFETY BRAKE FOR ROLLER COASTERS
Filed Nov. 28, 1945 2 Sheets-Sheet 1

INVENTOR.
HARVEY J. HUMPHREY
BY
ATTORNEYS

June 17, 1947.　　　H. J. HUMPHREY　　　2,422,416
SAFETY BRAKE FOR ROLLER COASTERS
Filed Nov. 28, 1945　　　2 Sheets-Sheet 2

INVENTOR.
HARVEY J. HUMPHREY
BY
Kwis, Hudson, Boughton & Williams
ATTORNEYS

Patented June 17, 1947

2,422,416

UNITED STATES PATENT OFFICE 2,422,416

SAFETY BRAKE FOR ROLLER COASTERS

Harvey J. Humphrey, Cleveland, Ohio

Application November 28, 1945, Serial No. 631,323

4 Claims. (Cl. 188—62)

This invention relates to a safety brake for roller coasters or the like used in amusement parks. It has been custsomary to provide roller coasters or the like at a location in advance of the passenger discharge point with means to preliminarily brake the movement of the cars before allowing the cars to coast slowly into the discharge point.

Roller coasters or the like are usually constructed so that when the preliminary braking means is released the cars will coast by gravity slowly to the passenger discharge point where their movement will again be braked to completely stop the forward motion of the cars.

The preliminary braking means for roller coasters and the like generally consists of a movable brake structure located intermediate the tracks and extending a substantial distance lengthwise thereof. This brake structure has vertical movement so that when it is raised it contacts brake surfaces on the underside of the cars. Ordinarily this braking structure is normally in lowered or inoperative position and must be manually raised by the attendant in order to brake the movement of an approaching car. The operation of such brake structure requires the use of considerable force or strength on the part of the operator since, as stated, said structure is of substantial length and located a substantial distance from the unloading point where the attendant stands and includes heavy wooden or metal structural members and, therefore, constitutes a considerable mass which the operator manually must raise in order to obtain the braking action. Also since these brake structures are normally in inoperative or lowered position the danger is ever present that the operator may, through inadvertence or due to his being engaged in the unloading of a car at the unloading point, fail to preliminarily brake or stop an approaching car before it reaches the unloading point, with the result that said car while traveling at high speed collides with the car being unloaded with resultant injury to the passengers of one or both of the cars and damage to the cars themselves.

The principal object of the present invention is to provide in a roller coaster or the like a braking structure for preliminarily braking the movement of the cars prior to the same reaching the unloading point and which structure is normally in raised or braking position, wherefore there is provided a safety feature preventing an approaching car crashing into a car which is being unloaded at the unloading point.

Another object of the invention is to provide in a roller coaster or the like means for preliminarily braking the movement of the cars at a location substantially in advance of the unloading point for the cars and which braking means is normally in raised or braking position and can be operated by the attendant to lowered or nonbraking position with a minimum of effort on his part.

A general object of the invention is to provide an improved roller coaster or the like which increases the safety factor and facilitates the operation and efficiency thereof.

Further and additional objects and advantages not hereinbefore referred to will become apparent hereinafter during the detailed description of an embodiment of the invention which is to follow and which embodiment is illustrated in the accompanying drawings wherein, Fig. 1 is a fragmentary elevational view of that portion of a roller coaster or the like where the cars are to be preliminarily braked and which portion is located a substantial distance in advance of the car unloading point; the brake mechanism embodying the invention being indicated in its normal raised or braking position by full lines and in its released lowered or nonbraking position by dot and dash lines.

Figure 2:
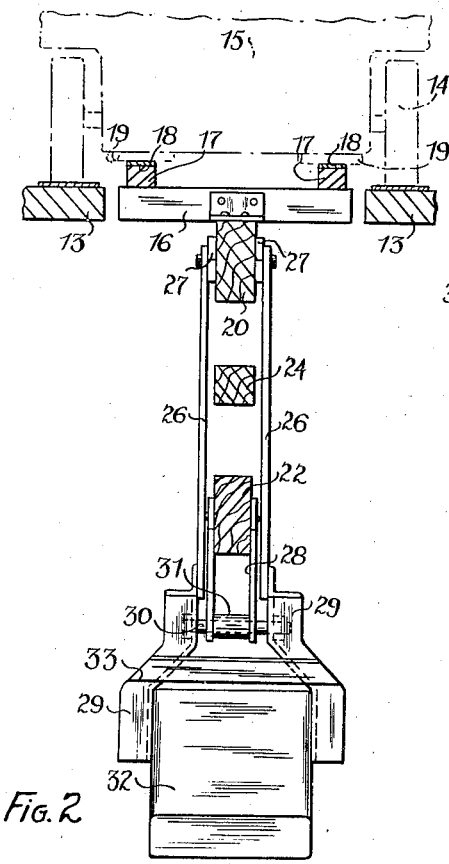
Figure 3:
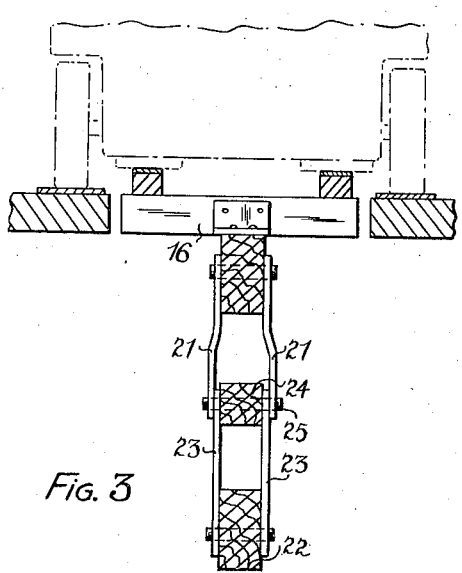
Figure 4:
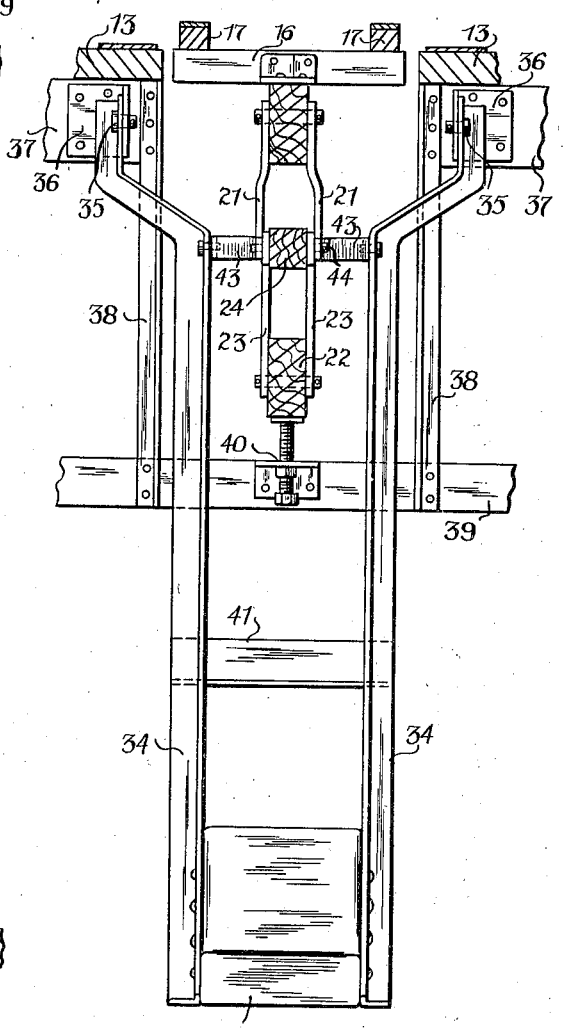

Figs. 2, 3 and 4 are transverse vertical sectional views through the roller coaster or apparatus taken substantially on lines 2—2, 3—3 and 4—4 of Fig. 1 looking in the direction of the arrows.

Roller coasters or the like are usually constructed similar to trestle-works of wooden or metal structural members as is well understood in the art, and consequently the general construction of the roller coaster to which the invention is applied is described herein with just enough particularity to establish the environment of the brake mechanism embodying the invention and to illustrate its utility. Ordinarily the roller coaster structures include vertical column members interconnected by horizontal beams or girder elements and in addition by diagonal or other suitable reenforcing or strengthening elements. The columns, beams and other elements of the structure support the rails on which the cars travel. Fig. 1 shows a portion of a roller coaster structure over which portion the cars travel after completing the main or thrilling part of the ride and prior to reaching the unloading point. It is customary to provide such portion of the roller coaster structure with means for preliminarily braking the movement of the cars before they reach the unloading point. Usually the cars are stopped or slowed down by such braking means, after which the braking means is released and the cars coast by gravity slowly into the unloading or passenger discharge point where they are again brought to a standstill by separate braking means located at such point. The unloading or passenger discharge point is not disclosed in the present drawing but it will be understood that it is some distance away from the portion where the cars are initially or preliminarily braked and such unloading point would be located to the left of the portion of the roller coaster shown in Fig. 1 and the attendant would be stationed at said unloading point and from said point would operate both the initial braking mechanism and the final braking mechanism.

In Fig. 1 only a single pair of vertical columns is shown, namely column 10 on one side of the roller coaster trestle-work and a column 11 on the other side thereof. It will be understood that these columns correspond to other similar pairs of columns located at spaced intervals along the length of the roller coaster and that said columns support and are interconnected by cross beams and reenforcing elements. The roller coaster includes track members 13 on which the wheels 14 of the cars 15 travel, it being understood that said wheels are held on the track member by suitable and well known means.

The structure for initially or preliminarily braking the movement of the cars before the latter reach the unloading station is located intermediate the track members 13 and extends a substantial distance lengthwise of the tracks. The brake structure is capable of vertical movement from a lowered or non-braking position to a raised or braking position where it cooperates with surfaces on the underside of the cars and brakes the movement of the cars.

As previously stated, it has been customary in braking structures of this character to have the same normally in the lowered or non-braking position and movable by the attendant or operator to the raised or braking position. Inasmuch as these braking structures are formed of long and heavy structural members and are located a substantial distance from the unloading point where the operator stands, considerable effort must be exerted by the operator to move said brake structures and the long operative connections between the structures and their operating levers. Also the usual arrangement requires the operator to maintain a careful watch on the approaching cars and to raise the braking structure to stop the same prior to allowing the cars to coast slowly to the unloading point. If the operator should fail to raise the braking structure as a car approaches there is always the danger that the car may be allowed to crash at high speed into a stopped car at the unloading point causing injury to the passengers of one or both cars and also damage to the cars.

The present invention contemplates a braking structure which is normally in raised or braking position and which is so constructed as to be readily lowered to non-braking position with a minimum effort on the part of the operator. Also the braking structure of the present invention is such that said structure after it has been lowered to non-braking position by the operator automatically returns to its normal raised or braking position even though the operator releases the control lever.

The braking structure embodying the present invention comprises a plurality of supporting members 16 spaced lengthwise of the portion of the roller coaster at which the braking structure is located and extending transversely thereof between the rails 13. The cross members 16 support on their upper sides transversely spaced longitudinally extending parallel members 17 indicated herein in the form of wooden members. The longitudinal members 17 are secured to the cross member 16 and interconnect the latter and are provided on their upper sides with brake plates or shoes 18 which preferably are in the form of metal strips. The brake plates or shoes 18 contact brake plates or shoes 19 mounted on the underside of the car 15 when the brake structure is in raised or braking motion and it is this contacting engagement between the brake plates 18 and 19 which effects the braking action.

The cross members 16 are mounted on and secured to a longitudinally extending movable beam or girder 20 located midway of the ends of the cross members and preferably in the form of a heavy wooden beam. The beam 20 has pivotally connected thereto at longitudinally spaced points along its length pairs of metal arms 21 with the arms of each pair located on opposite sides of the beam. Although only two pairs of such arms are shown in the drawings due to the braking structure being broken away between its ends it will be understood that the number of pairs of arms 21 is greater than two and may be any suitable number. As illustrative, reference is made to a braking structure which is approximately one hundred and forty (140) feet in length and is provided with six pairs of the arms 21.

The structure also includes a longitudinally extending beam 22 which is located directly beneath the beam 20 and extends parallel thereto and is fixedly mounted in the framework of the roller coaster. The beam 22 has pivotally connected thereto pairs of upwardly extending metal arms 23 corresponding in number to the pairs of arms 21 and located so that the upper ends of the arms 23 and the lower ends of the arms 21 overlap each other and are pivotally interconnected together and to an elongated brake operating bar 24 by means of pins 25. The interconnected pairs of arms 21 and 23 constitute toggles which are extended or collapsed by the movement of the actuating bar 24. It will be seen that when said toggles are extended as indicated by full lines in Fig. 1, then the beam 20 is in its raised position or braking position, while when said toggles are collapsed as indicated by dot and dash lines in said Fig. 1, the beam 20 is in its lowered or non-braking position.

In order to maintain the toggles extended and the braking structure normally in raised or braking position each toggle except the most left hand toggle as viewed in the drawings has operatively associated therewith the counterweight arrangement now to be described. Thus if there are six toggles in the structure, as previously illustrated and referred to, there will be five similar counterweight arrangements associated with five of the toggles while the sixth or left hand toggle will have a different form of counterweight associated with it.

Each of the similar counterweight arrangements comprises a pair of vertically extending metal straps 26 which have their upper ends pivotally connected to bracket plates 27 secured to the opposite sides of the movable beam 20. These straps 26 straddle the fixed beam 22 and extend below the lower side thereof. Said fixed beam 22 has rigidly secured to its opposite sides vertically depending straps 28 that project below the beam 22 and pivotally support at their lower ends outwardly facing angle members 29. The angle members 29 are pivotally connected intermediate their ends to the lower ends of the straps 28 by a pivot pin 30 extending through the angle members, through the lower ends of the straps 28 and through a spacer sleeve or bushing 31 located intermediate said straps. The right hand ends of the angle members 29, as viewed in the drawing, are pivotally connected to the lower ends of the straps 26 while the opposite ends of the angle members 29 support between them a counterweight container 32 in which may be placed suitable counterweighting means such as bars of lead or the like. The angle bars 29 intermediate their ends are interconnected by a cross member 33 as clearly shown in Figs. 1 and 2.

As already explained, there is a counterweight means as just described for each of the toggles except the most left hand toggle which has a different form of counterweight. The number of toggles and counterweights may vary depending upon the length of the braking mechanism and the size of the structural elements entering into its construction. Also the mass of the counterweights is correlated to the weight of the braking mechanism and should be of such magnitude that the counterweights are maintained normally in the full line position shown in Fig. 1 and act to maintain the toggles extended and the braking mechanism in raised or braking position, even though a loaded car is on the braking structure.

The operating bar 24 extends toward the left to the unloading or passenger discharge point where it is operatively connected to a pivoted control lever (not shown) located at the position where the attendant stands. It will be understood that when said actuating bar 24 is moved by the control lever in the direction A, indicated by the arrow in Fig. 1, the toggles are collapsed and the brake structure is lowered to non-braking position. It will also be understood that when the toggles are extended by the raising of the beam 20 under the action of the counterweights 32 the actuating bar 24 moves in the direction B as indicated by the arrow in Fig. 1.

As already stated, the most left hand toggle has operatively associated with it a different form of counterweight than the other toggles. This counterweight comprises downwardly extending parallel angles 34, the upper ends of which are outwardly and upwardly disposed to spread said ends farther apart and into position where they may be pivotally connected by means of pins 35 to angle brackets 36 rigidly secured to horizontally extending fixed structural elements 37 forming part of the roller coaster frame work. The inner and adjacent ends of the elements 37 are reenforced by vertically extending angle bars 38 which are rigidly secured to the elements 37 and to a horizontal structural member 39 also forming part of the roller coaster framework. The structural member 39 is provided with an adjustable supporting device indicated in its entirety at 40 which engages the underside of the fixed beam 22. The angles 34 of this counterweight are interconnected intermediate their ends by a transverse member 41 and at their lower ends mount a counterweight container 42 in which may be placed suitable counterweight elements such as bars of lead. Arms 43 are pivotally connected to the angles 34 and are inwardly bowed toward the actuating bar 24 so that said arms 43 can be pivotally connected to opposite sides of said bar as indicated at 44. It will be seen that the counterweight tends to move the bar 24 toward the left in the direction B and thus to straighten or extend the toggles and maintain the brake mechanism in raised or braking position.

Assuming that a car is approaching the braking structure which, as stated, is normally in raised or braking position, it will be evident that the brake shoes 18 and 19 will contact and the movement of the car will be slowed down and stopped. It will be understood that the counterweights 32 and the counterweight 42 are sufficient in weight to maintain the brake structure in raised braking position even though a car loaded with passengers is riding over the brake structure and its weight is tending to lower the same. However, the mass of the counterweights is calculated so that a slight force exerted by the operator on the control lever is sufficient to move the actuating bar 24 in direction A when a car has been stopped by the brake structure. Such movement of the actuating bar collapses the toggles and lowers the brake structure as already explained, whereupon the car can coast slowly along the downwardly inclined tracks between the initial braking position and the final braking position at the unloading point. It will be understood that the mechanism which effects the final braking of the car is separate from the mechanism which effects the initial braking thereof and which has been explained in detail herein.

It will be understood that although only one counterweight 32 is shown in the drawings, actually there are a plurality of such counterweights, namely one such counterweight for each toggle other than the most left hand toggle.

From the foregoing description it will be seen that the braking structure embodying the present invention obviates the danger of a car crashing into another car at the unloading point since the braking structure is normally in raised braking position. Therefore, the avoidance of such an accident is not dependent upon the alertness of the operator and thus the present invention constitutes a decidedly advantageous and valuable improvement over the previous constructions from the standpoint of safety of operation. Also the braking structure embodying the invention avoids the necessity of the operator using great strength, since the operator does not have to raise the braking structure to braking position and merely has to exert the small force required to overbalance the action of the counterweights when a car is on the braking structure, in order to lower the structure to non-braking position. When the operator has lowered the braking structure to non-braking position and releases the force that he applied to the control lever to do so, said structure and the control lever return automatically to their normal braking positions and a succeeding car riding upon the braking structure will have its forward motion stopped thereby.

Although a preferred embodiment of the invention has been illustrated and described herein it will be understood that the invention is susceptible of various modifications and adaptations within the scope of the appended claims.

Having thus described my invention, I claim:

1. In a roller coaster or the like of the type having a trestle work including tracks upon which the cars travel and means for stopping the cars at a passenger unloading station; a structure for preliminarily braking the movement of the cars before the same reach the unloading station comprising vertically movable means located intermediate and extending longitudinally of the tracks and provided with brake elements adapted to cooperate with brake elements on the underside of the cars when said means is in raised position, said means including an elongated substantially horizontal beam, a fixed beam extending parallel to said elongated beam and located beneath the same, a plurality of spaced toggles interconnecting said beams, an actuating bar located intermediate said beams and operatively connected with said toggles such that movement of said bar in one direction collapses said toggles and lowers said movable means while movement thereof in the opposite direction extends said toggles and raises said movable means to braking position, a plurality of longitudinally spaced counterweights movably carried by said fixed beam, and operative connections between said counterweights and said elongated beam for normally maintaining said movable means in raised braking position.

2. In a roller coaster or the like, a structure for preliminarily braking the movement of the cars as defined in claim 1 and including an additional counterweight movably carried by a fixed portion of said trestle work, and means operatively interconnecting said additional counterweight and said actuating bar such that said additional counterweight tends to move said bar in a toggle extending direction.

3. In a roller coaster or the like, a structure for preliminarily braking the movement of the cars as defined in claim 1 and wherein said toggles each comprises a pair of arms pivotally connected to opposite sides of the movable beam and depending therefrom, a pair of arms pivotally connected to opposite sides of said fixed beam and extending upwardly therefrom, and means pivotally connecting the lower ends of said depending arms with the upper ends of said upwardly extending arms and with said actuating bar, while said counterweights are pivotally connected to said fixed beam and are pivotally connected to the lower ends of upwardly extending straps straddling said beams and said bar and pivotally connected at their upper ends to said movable beam.

4. In a roller coaster or the like of the type having a trestle work including tracks upon which the cars travel and means for stopping the cars at a passenger unloading station; a structure for preliminarily braking the movement of the cars before the same reach the unloading station and comprising vertically movable means located intermediate and extending longitudinally of the tracks and provided with brake elements adapted to cooperate with brake elements on the underside of the cars when said means is in raised position, fixed means substantially coextensive in length with said movable means and located beneath the latter, a plurality of toggles interconnecting said movable and fixed means and spaced longitudinally thereof, a plurality of counterweights pivotally connected to said fixed means at longitudinally spaced points therealong, means operatively interconnecting said counterweights and said movable means, wherefore said counterweights normally maintain said movable means in raised braking position and said toggles extended, actuating means operatively connected with said toggles and adapted to be operated from said unloading station and to collapse said toggles and lower said movable means against the action of said counterweights to non-braking position, and another counterweight movably carried by a fixed portion of said trestle work and operatively connected to said actuating means and tending to move the latter in a direction to extend said toggles.

HARVEY J. HUMPHREY.

REFERENCES CITED

The following references are of record in the file of this patent:

UNITED STATES PATENTS

| Number | Name | Date |
|---|---|---|
| 1,137,342 | McCormick | Apr. 27, 1915 |
| 1,037,958 | Miller | Sept. 10, 1912 |